United States Patent
Fukuda (10) Patent No.: US 10,523,669 B2
(45) Date of Patent: Dec. 31, 2019

(54) SERVER, IC CARD PROCESSING APPARATUS, AND IC CARD PROCESSING SYSTEM

(71) Applicant: Kabushiki Kaisha Toshiba, Minato-ku (JP)

(72) Inventor: Aki Fukuda, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 126 days.

(21) Appl. No.: 15/630,288

(22) Filed: Jun. 22, 2017

(65) Prior Publication Data
US 2017/0374066 A1    Dec. 28, 2017

(30) Foreign Application Priority Data
Jun. 27, 2016    (JP) ................................ 2016-126573

(51) Int. Cl.
*H04L 29/06* (2006.01)
*G06F 21/32* (2013.01)

(52) U.S. Cl.
CPC .......... *H04L 63/0861* (2013.01); *G06F 21/32* (2013.01); *H04L 63/083* (2013.01)

(58) Field of Classification Search
CPC ... G06F 21/32; H04L 63/083; H04L 63/0853; H04L 63/0861; H04W 12/06; H04W 12/0608
See application file for complete search history.

(56) References Cited

U.S. PATENT DOCUMENTS

| 8,438,398 B2 * | 5/2013 | Masushio | ............. H04L 9/0861 713/179 |
| 2010/0293607 A1 * | 11/2010 | Hall | ........................ G06F 21/31 726/8 |

(Continued)

FOREIGN PATENT DOCUMENTS

| EP | 2 306 361 A1 | 4/2011 |
| JP | 2007-148480 | 6/2007 |

OTHER PUBLICATIONS

Extended European Search Report dated Oct. 25, 2017 in Patent Application No. 17177718.8.

(Continued)

*Primary Examiner* — Tae K Kim
(74) *Attorney, Agent, or Firm* — Oblon, McClelland, Maier & Neustadt, L.L.P.

(57) ABSTRACT

A server has a communication interface, a database, a biometric authentication means, a password specifying means, and a password transmission means. The database stores information in which, for each registrant, biometric information, identification information of an application and a password are associated with one another. The biometric authentication means is configured to, upon receiving biometric information and identification information of an application from an external processing apparatus, execute biometric authentication by using the received biometric information and biometric information of a registrant registered in the database. If biometric authentication is successful, the password specifying means refers to the database and specifies a password corresponding to the identification information of a successfully authenticated registrant. The password transmission means transmits the specified password to the external processing apparatus via the communication interface.

7 Claims, 3 Drawing Sheets

(56) References Cited

U.S. PATENT DOCUMENTS

| | | | | |
|---|---|---|---|---|
| 2012/0204245 A1* | 8/2012 | Ting | ............... | G06F 21/35 |
| | | | | 726/6 |
| 2012/0314911 A1* | 12/2012 | Paul | ............... | G06F 21/32 |
| | | | | 382/115 |
| 2014/0109200 A1* | 4/2014 | Tootill | ............ | G06F 21/32 |
| | | | | 726/5 |
| 2014/0289790 A1* | 9/2014 | Wilson | ............ | G06Q 20/42 |
| | | | | 726/1 |
| 2018/0218139 A1* | 8/2018 | Tussy | ............ | G06F 21/34 |

OTHER PUBLICATIONS

Nikolay Elenkov, "Using the SIM card as a secure element in Android" http://nelenkov.blogspot.de/2013/09/using-sim-card-as-secure-element.html, XP055178469, Sep. 2013, 7 pages.

* cited by examiner

SERVER, IC CARD PROCESSING APPARATUS, AND IC CARD PROCESSING SYSTEM

CROSS-REFERENCE TO RELATED APPLICATION(S)

This application is based upon and claims the benefit of priority from the prior Japanese Patent Application No. 2016-126573, filed on Jun. 27, 2016, the entire contents of which are incorporated herein by reference.

FIELD

Embodiments described herein generally relate to a server, an IC card processing apparatus, and an IC card processing system.

BACKGROUND

Conventionally, many simple personal authentication methods for confirming the identity of a person use passwords, and users need to memorize their own passwords. For example, for an IC card (multi-application IC card) on which a plurality of applications are installed, a single user may set different password for different applications. In this case, the user needs to memorize a plurality of different passwords for different applications, and is likely to forget which of the passwords is required to be input to which of the applications.

DETAILED DESCRIPTION

According to an embodiment, a server has a communication interface, a database, a biometric authentication means, a password specifying means, and a password transmission means. The database stores information in which, for each registrant, biometric information, identification information of an application, and a password are associated with one another. The biometric authentication means is configured to, upon receiving biometric information and identification information of an application from an external processing apparatus, execute biometric authentication by using the received biometric information and biometric information of a registrant registered in the database. If biometric authentication is successful, the password specifying means refers to the database and specifies a password corresponding to the identification information of a successfully authenticated registrant. The password transmission means transmits the specified password to the external processing apparatus via the communication interface.

Referring to the accompanying drawings, the following is an explanation of embodiments.

Figure 1:
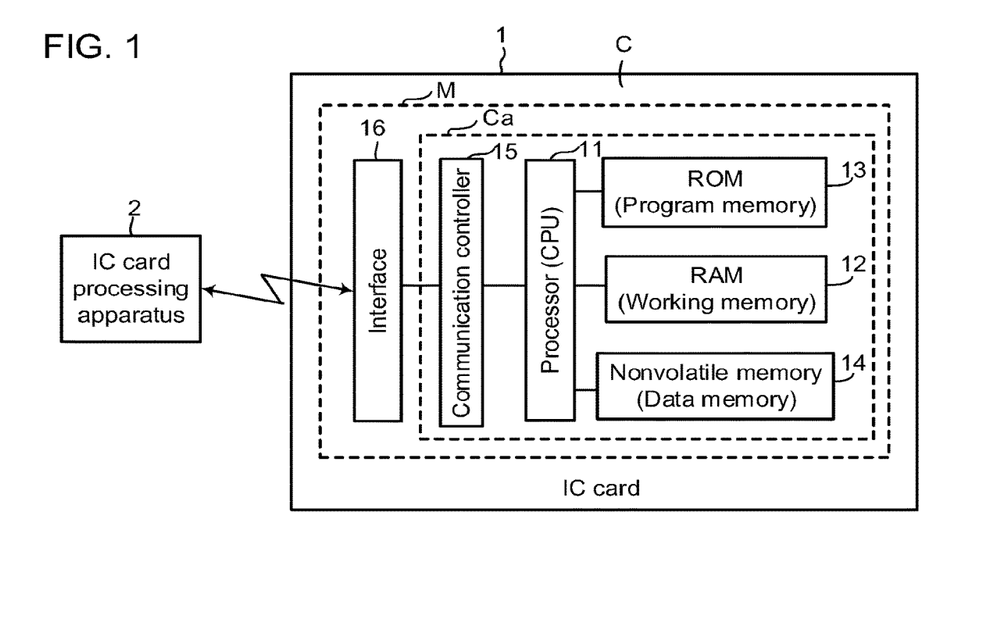
FIG. 1 is a diagram showing a configuration example of an IC card according to an embodiment.

FIG. 1 is a block diagram schematically showing a configuration example of an IC card 1 according to an embodiment.

The IC card 1 according to the embodiment together with an IC card processing apparatus 2 constitutes an IC card processing system. The IC card 1 is a portable electronic device that is activated (made to be operational) by power supplied from the IC card processing apparatus 2. The IC card 1 is also called a smart card. IC cards 1 are broadly divided into contact type IC cards (contact IC cards) and contactless type IC cards (contactless IC cards). For example, a contact IC card 1 is activated by being supplied with operating power and an operating clock signal from the IC card processing apparatus 2 via a contact unit serving as a communication interface. A contactless IC card 1 is activated by receiving a radio wave from the IC card processing apparatus 2 via an antenna serving as the communication interface, a modulation and demodulation circuit, and the like, and generating operating power and an operating clock signal from that radio wave.

As shown in FIG. 1, the IC card 1 has a main body C. The main body C is made of plastic or the like and formed into a card shape. The IC card 1 has a module M within the main body C. In the module M, one or more IC chips Ca and an external interface (interface) for communication are integrally formed in a connected state. The module M is embedded in the main body C. Moreover, as shown in FIG. 1, the module M of the IC card 1 has a processor 11, a RAM 12, a ROM 13, a nonvolatile memory 14, a communication controller 15, an interface 16, and the like.

The processor 11 includes a circuit that performs various types of processing. The processor 11 may be a CPU (Central Processing Unit), for example. The processor 11 performs overall control of the IC card 1. The processor 11 realizes various processing functions by executing programs stored in the ROM 13 or the nonvolatile memory 14. However, at least one or all of the various functions executed by the processor 11, which will be described later, may also be realized by a hardware circuit.

The RAM 12 is a volatile memory that functions as a working memory. The RAM 12 also functions as a buffer that temporarily stores data and the like undergoing processing by the processor 11. For example, the RAM 12 is provided with a communication buffer (transmission and receiving buffer) that temporarily stores data to be transmitted to and received from the IC card processing apparatus 2 via the communication controller 15 and the interface 16. The communication buffer provided in the RAM 12 is constituted by a transmission buffer that stores data to be transmitted and a receiving buffer that stores received data. Moreover, the RAM 12 also stores various types of control information for defining the communication buffer.

The ROM 13 is a nonvolatile memory that functions as a program memory. The ROM 13 is a flash memory, for example. Control programs, control data, and the like are preliminarily stored in the ROM 13. The ROM 13 is incorporated into the IC card 1 at the manufacturing stage in a state in which the control programs, the control data, and the like are stored therein. That is to say, the control programs and the control data stored in the ROM 13 are preliminarily incorporated in accordance with the specifications of the IC card 1. For example, the ROM 13 stores a program for the processor 11 to execute processing corresponding to a command received from the IC card processing apparatus 2.

The nonvolatile memory 14 is a nonvolatile memory to which data can be written and rewritten. The nonvolatile memory 14 is configured by, for example, an EEPROM (registered trademark) (Electrically Erasable Programmable Read Only Memory), a flash ROM, or the like. Programs corresponding to an operation purpose of the IC card 1 and various types of data are written to the nonvolatile memory 14. Moreover, a portion or the entirety of the region of the nonvolatile memory 14 is tamper-resistant, and data can be securely stored therein. In the nonvolatile memory 14, program files, data files, or the like are defined, and application programs and various types of setting data are written into those files. Examples of the data stored in the nonvolatile memory 14 will be described in detail later.

The communication controller 15 is connected to the interface 16. The interface 16 is an interface for communicatively connecting to an external apparatus. The communication controller 15 and the interface 16 constitute a communication unit. The communication controller 15 and the interface 16 realize a communication function that uses a communication method corresponding to an interface of the IC card processing apparatus 2. Moreover, the communication controller 15 and the interface 16 may also be configured to support a plurality of communication methods (e.g., contact communication and contactless communication).

In the case where the IC card 1 is realized as a contact IC card, the communication controller 15 and the interface 16 constitute a communication unit that communicates with the IC card processing apparatus 2 through contact therewith. In this case, the interface 16 is constituted by a contact unit that can be brought into physical and electrical contact with a contact unit of the IC card processing apparatus 2, and the communication controller 15 is constituted by a circuit or the like that controls transmission and receiving of signals via the contact unit.

In the case where the IC card 1 is realized as a contactless IC card, the communication controller 15 and the interface 16 constitute a communication unit that communicates with a card reader/writer of the IC card processing apparatus 2 in a contactless (wireless) manner. In this case, the interface 16 is constituted by an antenna that can transmit and receive radio waves, and the communication controller 15 is constituted by a modulation circuit for generating a radio wave to be transmitted, a demodulation circuit for generating a signal from a received radio wave, and the like.

Next, a configuration of the IC card processing apparatus 2 and the IC card processing system will be described.

Figure 2:
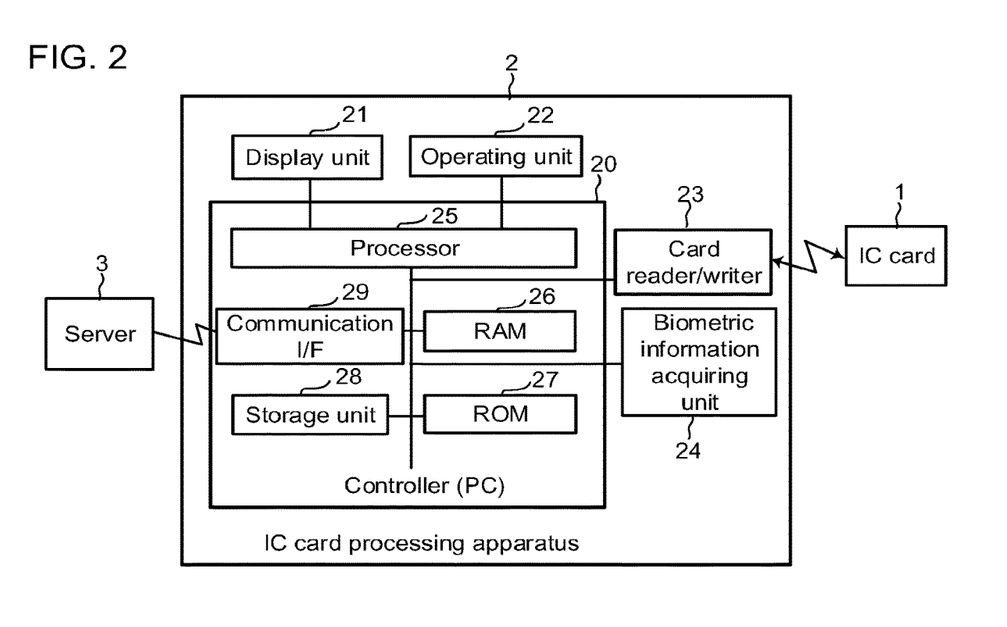
FIG. 2 is a diagram showing a configuration example of an IC card processing apparatus and an IC card processing system according to an embodiment.

FIG. 2 is a block diagram schematically showing a configuration example of an IC card processing apparatus and an IC card processing system according to an embodiment.

As shown in FIG. 2, the IC card processing system is a system having the IC card processing apparatus 2 and the server 3. The IC card processing apparatus 2 is an apparatus for processing the IC card 1 and has the function of communicating with the server 3. The server 3 is an apparatus that executes biometric authentication in response to a request from an IC card processing apparatus, and manages biometric information and the like of a registrant that is used for biometric authentication.

In the configuration example shown in FIG. 2, the IC card processing apparatus 2 has a controller 20, a display unit 21, an operating unit 22, a card reader/writer 23, a biometric information acquiring unit 24, and the like. For example, the controller 20 is configured by a personal computer (PC), and the IC card processing apparatus 2 can be realized as an apparatus in which the card reader/writer 23 and the biometric information acquiring unit 24 are connected to a PC serving as the controller 20.

The controller 20 controls the overall operations of the IC card processing apparatus 2. In the configuration example shown in FIG. 2, the controller 20 is constituted by a processor (CPU) 25, a RAM 26, a ROM 27, a storage unit 28, a communication interface (I/F) 29, and the like. The processor 25 executes various types of processing by executing programs stored in the ROM 27 or the storage unit 28. The RAM 26 functions as a working memory that temporarily stores data. The ROM 27 is a nonvolatile memory that stores programs, control data, and the like. The storage unit 28 is a rewritable nonvolatile memory. The storage unit 28 stores application programs, setting data, and the like. The communication I/F 29 is an interface for communicating with an external apparatus. In addition, the ROM 27 can be omitted if the contents of the ROM 27 are stored in the storage unit 28.

The controller 20 has the function of transmitting a command to the IC card 1 via the card reader/writer 23, the function of performing various types of processing based on data received from the IC card 1, and other functions. For example, the controller 20 performs control to write data to the nonvolatile memory in the IC card 1 by transmitting a data write command to the IC card 1 via the card reader/writer 23. Also, the controller 20 performs control to read data from the IC card 1 by transmitting a read command to the IC card 1.

The display unit 21 is a display apparatus that displays various types of information as controlled by the controller 20. The operating unit 22 is constituted by a keyboard, a numeric keypad, a pointing device, and the like. The operating unit 22 is a unit for allowing an operator of the IC card processing apparatus 2 to input various operating instructions, data, and the like. The operating unit 22 also functions as an input unit for inputting identification information of a user of the IC card 1, authentication information such as a password, and the like.

The card reader/writer 23 is an interface apparatus for communicating with the IC card 1. The card reader/writer 23 is configured by an interface corresponding to the communication method of the IC card 1. For example, in the case where the IC card 1 is a contact type IC card, the card reader/writer 23 is constituted by a contact unit for physically and electrically connecting to the contact unit of the IC card 1, and the like. In the case where the IC card 1 is a contactless type IC card, the card reader/writer 23 is constituted by an antenna for performing wireless communication with the IC card 1, a communication controller, and the like. The card reader/writer 23 supplies power and a clock signal to the IC card 1, performs reset control of the IC card 1, and transmits and receives data to and from the IC card 1. Based on the control by the controller 20, the card reader/writer 23 activates (switches on) the IC card 1, transmits various commands, receives responses to the transmitted commands, and so on.

The biometric information acquiring unit 24 is a device that photographs (acquires) biometric information of the user. That is to say, the biometric information acquiring unit 24 may be any device capable of acquiring biometric information that can be used for biometric authentication on the server 3. For example, in the case where the biometric information used for biometric authentication is a facial image, the biometric information acquiring unit 24 is configured by a camera that captures an image containing the user's face. In the case where the biometric information used for biometric authentication is a fingerprint, the biometric information acquiring unit 24 is configured by a fingerprint sensor that reads the user's fingerprint. Moreover, as will be described later, the processor 25 serves as a biometric authentication requiring means and a processing requiring means.

Next, a configuration of the server 3 will be described.

Figure 3:
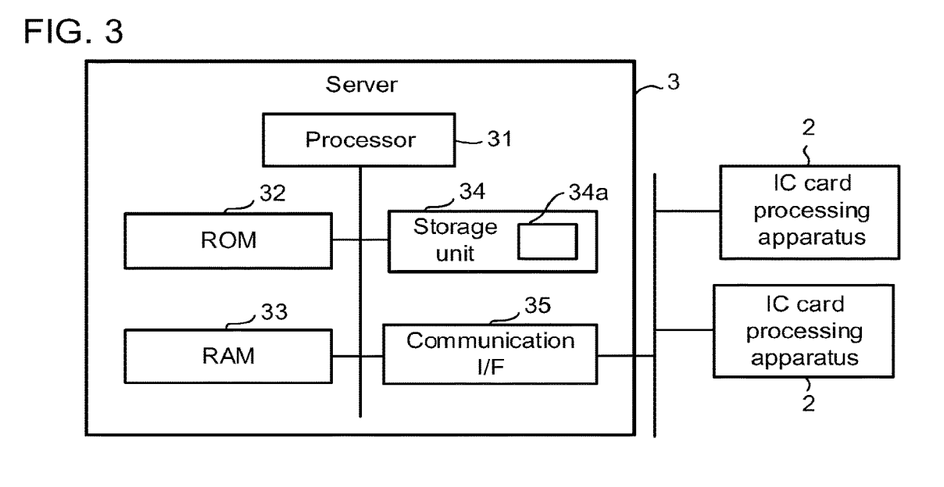
FIG. 3 is a diagram showing a configuration example of a server according to an embodiment.

FIG. 3 is a block diagram schematically showing a configuration example of the server 3 according to an embodiment.

In the configuration example shown in FIG. 3, the server 3 is constituted by a processor 31, a ROM 32, a RAM 33, a storage unit 34, a communication interface (I/F) 35, and the like. The ROM 32, the RAM 33, and the storage unit 34 constitute a storage device. In addition, the ROM 32 can be omitted if the contents of the ROM 32 are stored in the storage unit 34.

The processor 31 includes an arithmetic processing circuit such as a CPU, for example. The processor 31 is a controller that controls the operation of the server 3. The processor 31 executes various types of processing by executing programs stored in the ROM 32 or the storage unit 34. The ROM 32 is a nonvolatile memory that stores programs, control data, and the like. The RAM 33 functions as a working memory that temporarily stores data. The storage unit 34 is a rewritable nonvolatile memory. The storage unit 34 stores application programs, setting data, and the like. Moreover, the storage unit 34 has a database 34a that stores, for each registrant, authentication information, application information (identification information), and a password. The communication I/F 35 is an interface for communicating with the IC card processing apparatus 2. The communication I/F 35 may also be an interface that is connected to the IC card processing apparatus 2 via a VPN.

Next, a configuration example of application data stored in the nonvolatile memory 14 of the IC card 1 according to the present embodiment will be described.

Figure 4:
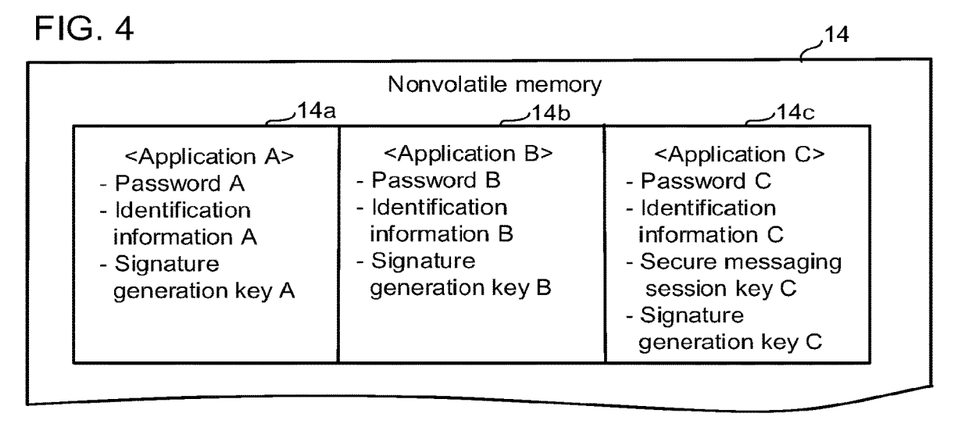
FIG. 4 is a diagram showing an example of setting data for a plurality of applications held by an IC card according to an embodiment.

FIG. 4 is a diagram showing an example of the application data in the nonvolatile memory 14 of the IC card 1.

In the configuration example shown in FIG. 4, it is assumed that an application A, an application B, and an application C are installed on the IC card 1. The nonvolatile memory 14 has a first storage region 14a, a second storage region 14b, and a third storage region 14c. The first storage region 14a, the second storage region 14b, and the third storage region 14c store setting data for the respective applications A, B, and C. The nonvolatile memory 14 stores, as information that identifies the holder (user) of the IC card 1, identification information (membership number) of the user, a card number of the IC card 1, and the like. It should be noted that programs of the applications A, B, and C may be stored in the nonvolatile memory 14, or may be stored in the ROM 13.

In the example shown in FIG. 4, the first storage region 14a stores, as setting data for the application A, a password A, identification information A, a signature generation key A, and the like. The second storage region 14b stores, as setting data for the application B, a password B, identification information B, a signature generation key B, and the like. The third storage region 14c stores, as setting data for the application C, a password C, identification information C, a signature generation key C, a secure messaging session key C, and the like.

The passwords A, B, and C are pieces of information which are set for each user in association with the respective applications and each of which is authentication information that is required for authentication to execute the corresponding application A, B, or C. The passwords A, B, and C are each set as data in which, for example, pieces of information such as numbers, characters, symbols, or the like are combined together. It should be noted that the authentication information that is required for authentication to execute the applications A, B, and C may also be information other than a password.

The identification information A, B, and C refers to pieces of information for identifying the respective applications A, B, and C. Since the pieces of identification information A, B, and C are held in combination with respective passwords A, B, and C, the password for an application that is identified using the identification information can be determined.

The signature generation keys A, B, and C are pieces of key information with which the respective applications A, B, and C can generate an electronic signature. Moreover, in the example shown in FIG. 4, the third storage region 14c stores the secure messaging session key C as the setting data for the application C. The application C can protect a communication path through secure messaging using the session key C.

According to the example shown in FIG. 4, the nonvolatile memory of one IC card that can execute a plurality of applications stores setting data for each of the plurality of applications. The setting data for each application contains a password that is individually set. Moreover, the setting data for each application contains identification information dedicated for that application, so that a password for identification information can be determined.

Next, data stored in the database 34a of the server 3 according to the present embodiment will be described.

Figure 5:
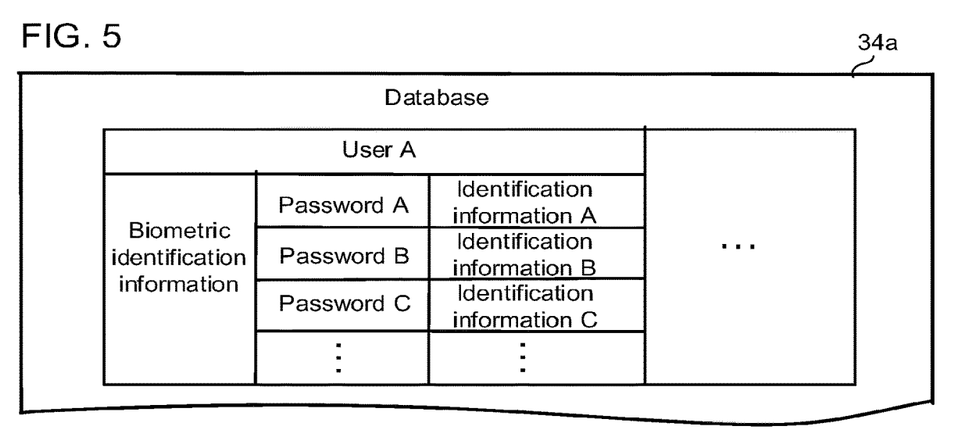
FIG. 5 is a diagram showing an example of registration information of a registrant managed by a server according to an embodiment.

FIG. 5 is a diagram showing an example of the data stored in the database 34a of the server 3.

In the example shown in FIG. 5, the database 34a stores, for each holder (registrant) who possesses an issued IC card, at least one piece of biometric authentication information and a password that is associated with identification information of each application. Moreover, the biometric authentication information is biometric information of the registrant, and is registered in the database 34a as dictionary data to be used for biometric authentication. In the example shown in FIG. 5, it is assumed that biometric information of the holder (user A) of the IC card 1 having the function of executing the plurality of applications A, B, and C is stored as biometric information for registration. Moreover, the identification information (membership number) of the user, the card number of the IC card 1, and the like are registered as information that specifies the holder (user A) of the IC card 1.

That is to say, the database 34a stores, as the biometric authentication information, biometric information of the registrant that is to be used for biometric authentication processing executed by the server 3. The biometric authentication information stored in the database 34a may be any piece of information with which biometric authentication processing for specifying a user can be performed. For example, in the case where face authentication is performed as biometric authentication, the database 34a stores a facial image or feature data for face authentication (comparison) of a registrant. Moreover, in the case where fingerprint authentication is performed as biometric authentication, the database 34a stores a fingerprint image or feature data for fingerprint authentication of a registrant.

The database 34a also stores, in association with the biometric authentication information of the user A, pieces of identification information of the respective applications that can be executed by the IC card 1 of that user A and passwords corresponding to the respective pieces of identification information. In the example shown in FIG. 5, the database 34a stores, for the user A, the password A that is associated with the identification information A of the application A, the password B that is associated with the identification information B of the application B, and the password C that is associated with the identification information C of the application C.

The processor 31 of the server 3 has the function of executing biometric authentication processing. Upon receiving biometric information to be authenticated and identification information of an application from the IC card processing apparatus 2, the processor 31 of the server 3 refers to the database 34a such as that shown in FIG. 5 and executes biometric authentication processing. If biometric authentication processing is successful, the processor 31 of the server 3 can specify the password corresponding to the identification information that has been received together with the biometric information with respect to which the biometric authentication processing was successful from the database 34a, and transmit the specified password to the IC card processing apparatus 2. That is to say, the processor 31 serves as a biometric authentication means, a password specifying means, and a password transmission means.

Next, an operation example of the IC card processing system according to the present embodiment will be described.

Figure 6:
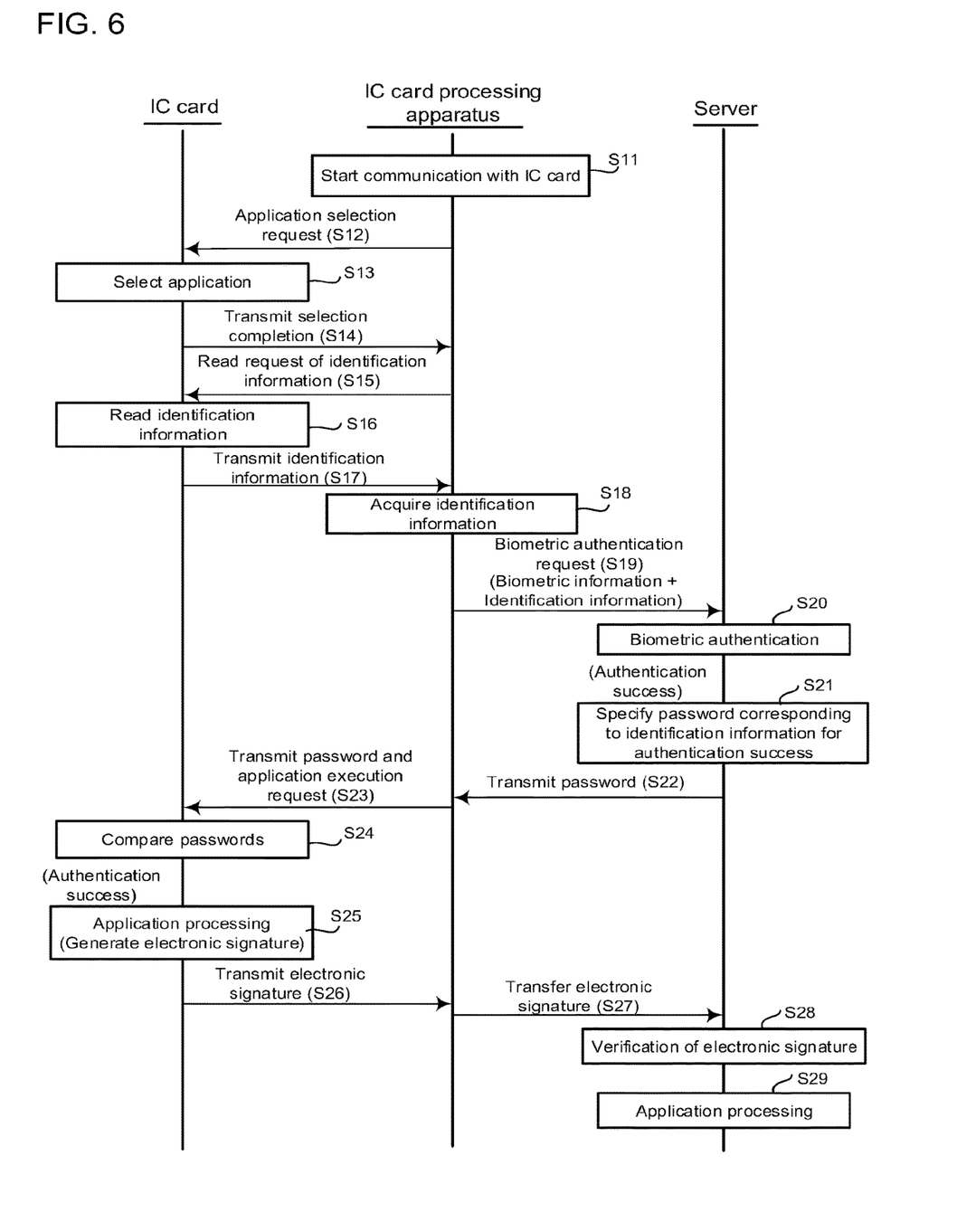
FIG. 6 is a diagram for explaining the flow of an operation of an IC card processing system according to an embodiment.

FIG. 6 is a diagram for explaining the operation example of the IC card processing system according to the embodiment.

The processor 25 of the IC card processing apparatus 2 on standby accepts the IC card 1 presented by the user. When the user presents the IC card 1, the processor 25 of the IC card processing apparatus 2 starts communication with the IC card 1 presented by the user (step S11). For example, if the IC card 1 is a contact IC card, the processor 25 of the IC card processing apparatus 2 accepts the IC card 1 inserted in an insertion slot and connects to the interface of the IC card 1 to establish communication therewith. Alternatively, if the IC card 1 is a contactless IC card, the processor 25 of the IC card processing apparatus 2 accepts the IC card 1 placed over a communication area and establishes communication with the IC card 1. It should be noted that in the case where the user presents the IC card 1, the user or an operator who has received a processing request from the user may also instruct contents of processing which should be executed the IC card processing apparatus 2 via the operating unit 22.

When communication with the IC card 1 is started, the processor 25 of the IC card processing apparatus 2 transmits an application selection request to the IC card 1, as a command to select an application corresponding to the instructed processing (step S12). For example, the processor 25 of the IC card processing apparatus 2 transmits an application selection command to select the application A to the IC card 1.

The IC card 1 receives the application selection request from the IC card processing apparatus 2 via the interface 16 and the communication controller 15. Upon receiving the application selection request, the processor 11 of the IC card 1 makes the application designated by the selection request executable (step S13). When the application designated by the selection request is made executable, the processor 11 of the IC card 1 transmits a response for notifying the IC card processing apparatus 2 that selection of the application has been completed, to the IC card processing apparatus 2 (step S14).

Upon receiving the response, that is, the notification that selection of the application has been completed, from the IC card 1, the processor 25 of the IC card processing apparatus 2 transmits a command to request the IC card 1 to read identification information to identify the selected application to the IC card 1 (step S15). Here, the processor 25 of the IC card processing apparatus 2 transmits a read command to request the IC card 1 to read the identification information of the application A, to the IC card 1.

Upon receiving the read command to request to read the identification information of the selected application, the processor 11 of the IC card 1 reads the identification information of the selected application from the nonvolatile memory (step S16), and transmits a response for notifying the IC card processing apparatus 2 of the read identification information, to the IC card processing apparatus 2 (step S17). For example, in the case where the application A is selected, the processor 11 of the IC card 1 reads the identification information A of the application A from the first storage region 14a of the nonvolatile memory 14, and transmits a response indicating the identification information A to the IC card processing apparatus 2. It should be noted that, in addition to the identification information of the application, the processor 11 of the IC card 1 also reads information that specifies the holder (user) of the IC card 1 and transmits the read information that specifies the holder (user) to the IC card processing apparatus 2. The information that specifies the holder (user) may be the identification information (membership number) of the user, the card number of the IC card 1, and the like, as described above.

Upon acquiring the identification information of the application selected by the IC card 1, the processor 25 of the IC card processing apparatus 2 holds the acquired identification information of the application in the RAM 26 or the like. Moreover, upon acquiring the identification information of the application, the processor 25 of the IC card processing apparatus 2 acquires biometric information of the user, who is a person to be authenticated, via the biometric information acquiring unit 24 (step S18). For example, in the case where biometric authentication is to be performed by using a facial image as the biometric information, the processor 25 acquires a facial image of the user via a camera serving as the biometric information acquiring unit 24. In the case where biometric authentication is to be performed by using a fingerprint as the biometric information, the processor 25 acquires fingerprint information of the user via a fingerprint sensor or the like serving as the biometric information acquiring unit 24.

It should be noted that the processor 25 may acquire the biometric information of the user at any timing prior to and during step S18. For example, the processor 25 of the IC card processing apparatus 2 may acquire the biometric information of the user immediately after starting communication with the IC card 1.

Upon acquiring the biometric information of the user, the processor 25 transmits a biometric authentication request (request for password through biometric authentication) containing the biometric information, which has been acquired by the biometric information acquiring unit 24, and the identification information of the application, which has been acquired from the IC card 1, to the server 3 via the communication I/F 29 (step S19). It should be noted that step S19 is the processing that is executed by the processor 25 as the biometric authentication requiring means, and is realized by the processor 25 executing a program stored in the ROM 27 or the storage unit 28.

The server 3 receiving the biometric authentication request receives the biometric authentication request from the IC card processing apparatus 2 via the communication I/F 35. Upon receiving the biometric authentication request, the processor 31 of the server 3 performs biometric authentication by using the received biometric information and the biometric information registered in the database 34a (step S20). For example, in the case where biometric authentication processing is performed using a facial image, the processor 31 of the server 3 compares the biometric information received from the IC card processing apparatus 2 with facial images of respective registrants registered in the database 34a and calculates the degrees of similarity. When the degrees of similarity to the facial images of the respective registrants have been calculated, the processor 31 judges that, if the highest degree of similarity is equal to or exceeds a predetermined threshold value (threshold value for determining the same person), the person in the received facial image matches the registrant of the highest degree of similarity (authentication is successful). On the other hand, if the highest degree of similarity is smaller than the threshold value, the processor 31 judges that a person who matches the person in the received facial image cannot be specified (authentication is unsuccessful). It should be noted that step S20 is the processing that is executed by the processor 31 as the biometric authentication means, and is realized by the processor 31 executing a program stored in the ROM 32 or the storage unit 34.

Moreover, for example, in the case where the biometric authentication request received from the IC card processing apparatus 2 contains information that specifies the holder (user), the biometric information of the holder (user) of the IC card 1 is specified from the database 34a based on that information. The processor 31 of the server 3 compares the biometric information received from the IC card processing apparatus 2 with the biometric information specified from the database 34a and calculates the degree of similarity. If the degree of similarity is equal to or exceeds a predetermined threshold value (threshold value for determining the same person), the processor 31 judges that the person in the received facial image matches a registrant (authentication is successful). If the degree of similarity is smaller than the threshold value, the processor 31 judges that the person in the received facial image is not a registrant (authentication is unsuccessful).

If the processor 31 judges that authentication is successful, the processor 31 specifies the password corresponding to the identification information of the application that has been received together with the biometric authentication request, from the registration information of the successfully authenticated registrant in the database 34a (step S21). For example, in the case where the identification information A of the application A has been received, the processor 31 specifies the password corresponding to the identification information A, from the registration information of the successfully authenticated registrant. It should be noted that step S21 is the processing that is executed by the processor 31 as the password specifying means, and is realized by the processor 31 executing a program stored in the ROM 32 or the storage unit 34.

Upon specifying the password corresponding to the identification information (identification information of the application selected by the IC card 1) designated by the IC card processing apparatus 2 from the registration information of the successfully authenticated registrant, the processor 31 transmits the specified password to the IC card processing apparatus 2, which is the source of the biometric authentication request (step S22). It should be noted that step S22 is the processing that is executed by the processor 31 as the password transmission means, and is realized by the processor 31 executing a program stored in the ROM 32 or the storage unit 34.

The IC card processing apparatus 2 that has transmitted the biometric authentication request (request for password through biometric authentication) receives the password corresponding to the designated identification information (application selected by the IC card 1) as a result of biometric authentication from the server 3 via the communication I/F 29.

In the case where the password is received in response to the biometric authentication request, the processor 25 of the IC card processing apparatus 2 transmits the password that has been acquired from the server 3 as a result of biometric authentication and a command to perform the application, to the IC card 1 (step S23). It should be noted that step S23 is the processing that is executed by the processor 25 as the processing requiring means, and is realized by the processor 25 executing a program stored in the ROM 27 or the storage unit 28.

The IC card 1 receives the password and the command to perform the application from the IC card processing apparatus 2. Upon receiving such a command, the processor 11 of the IC card 1 compares the received password with the password that has been set to the selected application (step S24). For example, in the case where the application A is selected, the processor 11 of the IC card 1 compares the password A corresponding to the application A stored in the first storage region 14a with the password received from the IC card processing apparatus 2.

If comparison of the password is successful, the processor 11 of the IC card executes application processing with respect to which execution has been requested (step S25). In the processing example shown in FIG. 6, it is assumed that the IC card 1 generates an electronic signature as an example of the application processing, and then the server 3 verifies the electronic signature. In this case, the processor 11 of the IC card 1 generates the electronic signature by using the signature generation key corresponding to the selected application. For example, in the case where the application A is selected, the processor 11 generates an electronic signature by using the signature generation key A corresponding to the application A, which is stored in the first storage region 14a.

Upon generating the electronic signature as the application processing, the processor 11 transmits the generated electronic signature to the IC card processing apparatus 2 (step S26). The processor 25 of the IC card processing apparatus 2 receives the electronic signature transmitted from the IC card 1 via the communication I/F 29, and transfers the received electronic signature to the server 3 (step S27). Thus, the server 3 receives the electronic signature generated by the IC card 1 via the IC card processing apparatus 2.

Upon receiving the electronic signature generated by the IC card 1 via the IC card processing apparatus 2, the processor 31 of the server 3 verifies the received electronic signature (step S28). If the received electronic signature is successfully verified, the processor 31 of the server 3 is enabled to execute the application stored in the storage unit or the like of the server 3 (step S29). In this manner, access control can be performed so that a user having a valid IC card is allowed to perform application processing on the server if successfully authenticated through biometric authentication.

According to the above-described processing, processing within the IC card 1 and information exchanged between the IC card 1 and the IC card processing apparatus 2 are similar to those of an operation (flow of processing) in which the IC card 1 is requested to perform comparison by using a password input by the user via the operating unit 22 of the IC card processing apparatus 2. That is to say, with an IC card having such a specification in which comparison is performed by using a password supplied from the IC card processing apparatus 2 for a selected application, the above-described IC card processing system can execute the processing in accordance with the above-described flow. In other words, the IC card processing system according to the present embodiment is a system that can be realized even when the IC card 1 that performs comparison by using a password from the IC card processing apparatus 2 has an existing specification.

As described above, the IC card processing system according to the present embodiment is a system for processing an IC card on which a plurality of applications are installed, with passwords being set for the respective applications, and has an IC card processing apparatus and a server. The server stores, in a database, information in which biometric authentication information, a password, and identification information are listed for each of the holders of issued IC cards. The IC card processing apparatus transmits biometric information acquired from a person to be authenticated and identification information of an application selected by an IC card presented by the person to be authenticated, to the server along with an authentication request. The server executes biometric authentication processing by using the biometric information from the IC card processing apparatus and the biometric authentication information stored in the database. The server transmits a password corresponding to the received identification information, of a registrant who has been successfully authenticated through biometric authentication with the biometric information received from the IC card processing apparatus, to the IC card processing apparatus. The IC card processing apparatus requests the IC card to execute the application by transmitting the password received from the server to the IC card.

That is to say, in the IC card processing system according to the present embodiment, the server manages passwords of respective applications in the IC card and biometric information that is required for biometric authentication such as face authentication, and if biometric authentication on the server is successful, the password is transmitted from the server to the IC card via the IC card processing apparatus. Thus, even if the user does not remember the password, the application can be made executable by employing biometric information acquired by the IC card processing apparatus from the user. As a result, highly convenient operation that eliminates the necessity for the user to memorize a password can be realized even when the IC card itself is an existing IC card.

Moreover, the IC card processing system according to the embodiment does not perform biometric authentication on an external apparatus by reading biometric information stored in the IC card, but rather stores biometric information and a password in the server and executes biometric authentication on the server. With this configuration, an existing IC card can be used as is. In addition, even without a special apparatus such as a biometric authentication apparatus, if the IC card processing apparatus is provided with a biometric information acquiring unit, such as a video camera, for acquiring biometric information, the server capable of communicating with the IC card processing apparatus can execute biometric authentication. Moreover, according to the above-described embodiment, since the server can manage biometric information without the necessity for the IC card to store biometric information for registration, highly convenient operation can be realized with a high degree of security without incurring introduction costs. For example, in the case where face authentication is performed as biometric authentication, the IC card processing system can be realized by installing a general-purpose video camera or the like in the IC card processing apparatus, and can be configured such that, even in the case where face authentication, which requires advanced processing, is adopted, the server can execute face authentication processing, which has a high processing load.

Moreover, in the IC card processing system according to the embodiment, the server manages (stores) passwords, and the IC card processing apparatus stores no password. Thus, password security can also be ensured. Furthermore, since the server performs biometric authentication processing, the server can manage biometric information of registrants, and thus, the security for biometric information of registrants can also be ensured.

It should be noted that the functions described in the foregoing embodiments are not limited to a configuration in which those functions are realized with hardware. The functions described in the foregoing embodiments may also be realized by a processor of a computer executing programs of the respective functions stored in a memory. That is to say, it is sufficient if the functions described in the foregoing embodiments can be realized with either software or hardware as appropriate.

While certain embodiments of the present invention have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A server comprising:
a processor;
a communication interface configured to communicate with an external processing apparatus;
a storage which stores a database configured to store, for each registrant, biometric information and information in which identification information of an application and a password are associated with each other, and which stores a program;
wherein the processor functions as following means by executing the program:
a biometric authentication means for, upon receiving biometric information and identification information of a selected application from the external processing apparatus via the communication interface, executing biometric authentication by using the biometric information received via the communication interface and the biometric information of a registrant registered in the database;

a password specifying means for, if the biometric authentication by the biometric authentication means is successful, specifying the password corresponding to the identification information from registration information of a successfully authenticated registrant with reference to the database; and a password transmission means for transmitting the password specified by the password specifying means to the external processing apparatus via the communication interface, wherein the external processing apparatus is an IC card processing apparatus having a function of communicating with an IC card possessed by a specific user, wherein the database stores a holder of an IC card that can be processed by the IC card processing apparatus as a registrant and stores information in which identification information of an application that can be executed by the IC card and a password for allowing the IC card to execute the application are associated with each other, wherein the IC card processing apparatus has a card reader/writer, a biometric information acquiring unit and a communication interface, wherein the IC card processing apparatus is configured to acquire the identification information of the application from the IC card by the card reader/writer, acquire a biometric information of a user by the biometric information acquiring unit, transmit the identification information of the application and the biometric information of the user to the server by the communication interface of the IC card processing apparatus, receive the password transmitted from the password transmission means, and transmit the password received to the IC card, and wherein the IC card is configured to include a plurality of applications that are installed on the IC card, hold identification information of the plurality of applications in combination with respective passwords, transmit the identification information of the selected application to the IC card processing apparatus, receive the password from the IC card processing apparatus, and compare the password corresponding to the identification information of the selected application with the password received from the IC card processing apparatus.

2. The server according to claim 1,
wherein the biometric information is a facial image, and the biometric authentication is face authentication.

3. The server according to claim 1,
wherein, in the biometric authentication executed by the biometric authentication means, a degree of similarity between the biometric information received via the communication interface provided in the server and the biometric information of each registrant registered in the database is calculated, if a highest degree of similarity is equal to or exceeds a predetermined threshold value, it is judged that the biometric authentication is successful, and if the highest degree of similarity is smaller than the predetermined threshold value, it is judged that the biometric authentication is unsuccessful.

4. The server according to claim 1,
wherein, when the biometric authentication means receives information that specifies a user, the biometric information, and the identification information of the application from the external processing apparatus via the communication interface provided in the server, the biometric authentication means executes the biometric authentication by using, based on the information received that specifies the user, the biometric information of the registrant registered in the database and corresponding to the information that specifies the user and the biometric information received.

5. An IC card processing apparatus comprising:
a processor;
a storage configured to store a program;
a card reader/writer configured to communicate with an IC card;
a communication interface configured to communicate with a server; and
a biometric information acquiring unit configured to acquire biometric information of a person who has presented an IC card that communicates with the card reader/writer;
wherein the processor functions as following means by executing the program:
a biometric authentication requiring means for transmitting identification information of a selected application received from the IC card via the card reader/writer and the biometric information acquired by the biometric information acquiring unit, to the server having a biometric authentication function; and
a processing requiring means for acquiring from the server the password corresponding to the identification information from registration information of a registrant who has been successfully authenticated through the biometric authentication on the server with respect to the biometric information transmitted by the biometric authentication requiring means, and configured to transmit the password acquired from the server and a command to perform application processing to the IC card,
wherein the IC card is configured to include a plurality of applications that are installed on the IC card, hold identification information of the plurality of applications in combination with respective passwords, transmit the identification information of the selected application to the IC card processing apparatus, receive the password from the IC card processing apparatus, and compare the password corresponding to the identification information of the selected application with the password received from the IC card processing apparatus.

6. The IC card processing apparatus according to claim 5,
wherein the biometric information is a facial image, and the biometric authentication is face authentication.

7. An IC card processing system comprising an IC card processing apparatus and a server,
the server comprising:
a first processor;
a first communication interface configured to communicate with the IC card processing apparatus;
a first storage configured to store a database configured to store, for each registrant, biometric information, information in which identification information of an application and a password are associated with each other, and store a first program;
wherein the first processor functions as following means by executing the first program:
a biometric authentication means for, upon receiving biometric information and identification information of a selected application from the IC card processing apparatus via the first communication interface, executing biometric authentication by using the biometric information received via the first communication interface and the biometric information of a registrant registered in the database;

a password specifying means for, if the biometric authentication by the biometric authentication means is successful, specifying a password corresponding to the identification information from registration information of a successfully authenticated registrant with reference to the database; and a password transmission means for transmitting the password specified by the password specifying means to the IC card processing apparatus via the first communication interface, and the IC card processing apparatus comprising:

a second processor;

a second storage configured to store a second program;

a card reader/writer configured to communicate with an IC card;

a second communication interface configured to communicate with the server;

a biometric information acquiring unit configured to acquire biometric information of a person who has presented an IC card that communicates with the card reader/writer;

wherein the second processor functions as following means by executing the second program:

a biometric authentication requiring means for transmitting identification information of a selected application received from the IC card via the card reader/writer and the biometric information acquired by the biometric information acquiring unit, to the server having a biometric authentication function; and a processing requiring means for acquiring from the server the password corresponding to the identification information from registration information of a registrant who has been successfully authenticated through biometric authentication on the server with respect to the biometric information transmitted by the biometric authentication requiring means, and for transmitting the password acquired from the server and a command to perform application processing to the IC card, and wherein the IC card is configured to include a plurality of applications that are installed on the IC card, hold identification information of the plurality of applications in combination with respective passwords, transmit the identification information of the selected application to the IC card processing apparatus, receive the password from the IC card processing apparatus, and compare the password corresponding to the identification information of the selected application with the password received from the IC card processing apparatus when receiving the password from the IC card processing apparatus.

* * * * *